United States Patent [19]

Scharrer et al.

[11] Patent Number: 5,457,175
[45] Date of Patent: Oct. 10, 1995

[54] LOW SOFTENING POINT TERPENE-PHENOL RESINS

[75] Inventors: Roland P. Scharrer, Pelham, N.Y.; Kerry L. Thompson, Panama City, Fla.; Josie M. Rosen, Highland Mills, N.Y.

[73] Assignee: Arizona Chemical Company, Panama City, Fla.

[21] Appl. No.: 371,426

[22] Filed: Jan. 11, 1995

[51] Int. Cl.⁶ .................................................. C08G 69/00
[52] U.S. Cl. ........................................................ 528/205
[58] Field of Search ............................................ 528/205

[56] References Cited

U.S. PATENT DOCUMENTS

| | | | |
|---|---|---|---|
| 2,343,845 | 3/1944 | Powers | 260/62 |
| 2,373,706 | 4/1945 | Ott | 260/80 |
| 2,378,436 | 6/1945 | Rummelsburg | 260/62 |
| 2,471,455 | 5/1949 | Rummelsburg | 260/62 |
| 2,475,201 | 7/1949 | Rummelsburg | 260/619 |
| 2,596,235 | 5/1952 | Geiger | 260/619 |
| 3,297,673 | 1/1967 | Sellers et al. | 260/93.3 |
| 3,383,362 | 5/1968 | Gonzenbach | 260/62 |
| 3,467,632 | 9/1969 | Davis | 260/80.7 |
| 3,586,738 | 6/1971 | Weymann et al. | 260/890 |
| 3,625,874 | 12/1971 | Cottman et al. | 260/5 |
| 3,692,844 | 9/1972 | Hollis et al. | 260/619 D |
| 3,923,759 | 12/1975 | Kennedy et al. | 260/88.2 |
| 3,929,938 | 12/1975 | White et al. | 260/897 |
| 3,976,606 | 8/1976 | Gobran | 260/4 |
| 3,993,626 | 11/1976 | Laurito | 260/47 |
| 4,056,513 | 11/1977 | Lahourcade et al. | 260/62 |
| 4,081,425 | 3/1978 | Gscheidmeier et al. | 260/62 |
| 4,324,871 | 4/1982 | Acharya et al. | 525/149 |
| 4,544,600 | 10/1985 | Kern | 428/323 |
| 4,701,517 | 10/1987 | Daughenbaugh, Jr. | 528/205 |
| 4,759,797 | 7/1988 | Umeda et al. | 106/30 |

*Primary Examiner*—Morton Foelak
*Attorney, Agent, or Firm*—Luedeka, Neely & Graham

[57] ABSTRACT

A process for preparing a terpene-phenol resin with a softening point in the range of from about 80° C. to about 110° C. The method comprises preparing a reaction mixture including a terpene, phenol and a complex of boron trifluoride. The boron trifluoride complex is selected from the group consisting of a ether complex of boron trifluoride, wherein the ether has an molecular weight in the range of from about 46 to about 140, and an organic acid complex of boron trifluoride, wherein the organic acid has a molecular weight in the range of from about 46 to about 300. The reaction mixture is maintained at a temperature in the range of from about 50° C. to about 90° C. for a period of time sufficient to produce the α-pinene-phenol resin which is then recovered from the reaction mixture. The terpene may be selected from the group consisting of α-pinene, β-pinene, δ-3-carene, dipentene, limonene and mixtures of those terpenes.

11 Claims, No Drawings

LOW SOFTENING POINT TERPENE-PHENOL RESINS

FIELD OF THE INVENTION

The present invention relates to low softening point resins for use in adhesives and ink formulations and methods for their preparation.

BACKGROUND OF THE INVENTION

The manufacture of terpene-phenol resins with low softening points (that is, softening points in the range of from about 80° C. to about 110° C.) is very difficult. The traditional methods for producing such resins use one of two approaches. In the first approach diluents such as mineral oil or polyolefin oligmers are added to resins having higher softening points. This approach usually results in reduced adhesive or ink formulation performance or excessively high amounts of volatiles in the resulting resin. In addition, the use of diluents and consequent extra handling of the resin increases the cost of the final product.

The second approach is to synthesize the low softening point resin directly. Generally, the synthetic methods in current use produce base resins that cannot be finished to softening points below 110° C. without leaving substantial amounts of process solvents and/or phenol in the resin. Again, this results in decreased adhesive or ink formulation performance.

For example, U.S. Pat. No. 3,929,938 discloses processes for producing limonene-phenol condensation products using relatively low reaction temperatures (from about 10° C. to about 45° C.). However, the products have high softening points (greater than 140° C.). Thus, the process does not produce the desired low softening point products.

The process disclosed in U.S. Pat. No. 3,993,626 also produces phenol-modified hydrocarbon resins for use in printing inks. However, the process produces products with softening points well above the desired range (greater than 120° C.).

One route which might circumvent the problem of leaving substantial amounts of process solvents in the resin is taught in U.S. Pat. No. 4,056,513, which discloses that $\Delta^3$-carene and another terpene, such as $\alpha$-pinene, may be reacted with phenol using a three-step polymerization sequence using different temperatures in each step. The practice of the process requires the initial addition of about one-half of the desired $\Delta^3$-carene to a mixture of phenol and boron trifluoride. The boron trifluoride is used as the gas or as one of its usual complexes. A diphenolcarene is produced by the initial reaction at temperatures of between 80° C. and 120° C. The remainder of the $\Delta^3$-carene, with additional boron trifluoride compound, is then added to the diphenolcarene resin and reacted at a temperature between 80° C. and 120° C. for further condensation. Finally, upon completion of the $\Delta^3$-carene-phenol condensation, an active terpene is added to the reaction mixture and cooked at temperatures over 100° C.

The process is time consuming and is not convenient on a large scale. The use of other terpenes, such as $\alpha$-pinene, $\beta$-pinene, dipentene and/or limonene, alone results in resins with higher softening points and wider ranges of softening points. Since $\Delta^3$-carene is not readily available except in a few regions of the world, the process is of little use commercially in the United States.

Of much more use to U.S. industries would be a process for producing a low softening point terpene-phenol resin using a more readily available terpene, such as $\alpha$-pinene, $\beta$-pinene, dipentene and/or limonene. These terpenes are readily available from coniferous and citrus plants grown throughout the world. In addition, for commercial reasons it is desirable to provide a method for producing the resin using as few steps, and as few temperature changes, as possible.

The process of U.S. Pat. No. 4,701,517 provides a means for producing a terpene-phenol copolymer with lowered ring and ball softening points. The process uses boron trifluoride complexes to form the copolymers. However, the lowering of the softening point is afforded only by the addition of vinyl aromatics, such as styrene, in the copolymerization process. The resulting vinyl aromatic-terpene-phenol terpolymer has a lowered softening point but at the expense of the necessary addition of the vinyl aromatic which increases the expense of the reaction. In addition, the presence of vinyl aromatics are known to decrease the compatibility of the resulting resin with the materials used for adhesives and ink formulations.

The process of U.S. Pat. No. 3,625,874 provides a phenol-cyclic polyolefin reaction product but also requires a two-step reaction process. The boron trifluoride complex used in the process is eliminated between the first and the second step.

The process of U.S. Pat. No. 3,976,606 also discloses a method for making terpene-phenolic resins which uses a boron trifluoride complex. Again, however, the process uses a two-step reaction which increases the cost of the final product as well as the time required to produce the material.

The prior art and current practice for the production of low softening point terpene-phenol resins are expensive and time consuming. The current reaction schemes require exotic materials, such as carene, or several steps and/or a variety of temperatures to produce a useable resin.

It is an object of the present invention to provide a method for producing a terpene-phenol resin having a ring and ball softening point in the range of from about 80° C. to about 110° C.

In addition, it is an object of the present invention to provide such a method for producing a terpene-phenol resin wherein the terpene is $\alpha$-pinene, $\beta$-pinene, dipentene, limonene and/or $\Delta^3$-carene.

Further, it is an object of the present invention to provide a method for preparing a terpene-phenol resin having a ring and ball softening point in the desired range in a single-step-single-temperature process.

SUMMARY OF THE INVENTION

Having regard to the above and other objects and advantages, the present invention relates to a process for preparing a terpene-phenol resin with a softening point in the range of from about 80° C. to about 110° C. The method comprises preparing a reaction mixture including a terpene, phenol and a complex of boron trifluoride.

The reaction mixture is prepared by adding the complex of boron trifluoride with mixing to the phenol in an appropriate solvent. The boron trifluoride complex is selected from the group consisting of an ether complex of boron trifluoride, wherein the ether has a molecular weight in the range of from about 46 to about 140 daltons, and an organic acid complex of boron trifluoride, wherein the organic acid has a molecular weight in the range of from about 46 to about 300 daltons.

The phenol-boron trifluoride complex mixture is heated to a temperature in the range of from about 50° C. to about 90° C. and the terpene is added to the phenol-boron trifluoride complex mixture over a period of from about 0.5 hour to about 10 hours. The reaction mixture is then maintained at a temperature in the range of from about 50° C. to about 90° C. for a period of time sufficient to produce a terpene-phenol resin, which is then recovered from the reaction mixture.

In a preferred embodiment of the invention, the molar ratio of terpene to phenol is in the range of from about 1:1 to about 3:1 and the molar ratio of the complex of boron trifluoride to the total of terpene and phenol is in the range of from about 0.005:1 to about 0.05:1.

In another preferred embodiment of the invention, the terpene is selected from the group consisting of turpentines, α-pinene, β-pinene, limonene, dipentene, $\Delta^3$-carene and mixtures of those terpenes. The most preferred terpene is α-pinene.

In a further preferred embodiment of the invention, the ether complex of boron trifluoride is selected from the group consisting of a dimethyl ether complex of boron trifluoride, a diethyl ether complex of boron trifluoride, a diisopropyl ether complex of boron trifluoride, a tetrahydrofuran complex of boron trifluoride, a dibutyl ether complex of boron trifluoride. Also, it is preferred that the organic acid complex of boron trifluoride is selected from the group consisting of an acetic acid complex of boron trifluoride, a propionic acid complex of boron trifluoride, and a butyric acid complex of boron trifluoride.

The present invention also provides a terpene-resin prepared according to the process described above.

DETAILED DESCRIPTION OF THE INVENTION

In the practice of the present invention, a terpene phenol resin is prepared with a ring and ball softening point in the range of from about 80° C. to about 110° C. Such resins are highly desirable for use in adhesive and ink formulations.

The method for the preparation of the terpene-phenol resin comprises preparing a reaction mixture, heating that reaction mixture and then recovering the resulting resin from the reaction mixture. The reaction mixture includes a terpene, phenol and a complex of boron trifluoride. This reaction mixture may be supplemented with a variety of terpenes such as a mixture of α-pinene, β-pinene, dipentene, limonene, δ-3-carene and/or turpentines.

The step of preparing the reaction mixture includes dissolving the phenol in an organic solvent and adding the boron trifluoride complex. Generally, the boron trifluoride complex may be added neat or dissolved in the same solvent as that used for the phenol. If the boron trifluoride complex is dissolved in a solvent other than the one used for the phenol, then any compatible and miscible solvent system would be suitable for use in the present invention.

The phenol-boron trifluoride complex mixture is heated to a temperature in the range of from about 50° C. to about 90° C. after which the terpene is added over a period of time in the range of from about 0.5 hour to about 10 hours. The reaction is substantially complete upon the addition of the terpene but the reaction mixture is maintained at a temperature in the range of from about room temperature to about 90° C. for a period of time sufficient to fully complete the production of the terpene resin. That period of time generally ranges from about 15 minutes to about 5 hours, but preferably is about 30–120 minutes.

The boron trifluoride complex is preferably selected from the group consisting of ether complexes of boron trifluoride and organic acid complexes of boron trifluoride. The ether component of the ether complex of boron trifluoride generally has a molecular weight in the range of from about 46 to about 140. This includes ethers such as dimethyl ether, diethyl ether, diisopropyl ether, tetrahydrofuran, dibutyl ether, and methyl-tert-butyl ether. The acid portion of the organic acid complex of boron trifluoride generally has a molecular weight in the range of from about 46 to about 300 and includes formic acid, acetic acid, propionic acid and butyric acid.

The nature of the boron trifluoride catalyst system used in the reaction is of central importance to the practice of the invention. The use of a boron trifluoride catalyst system which does not conform to the limitations described above results in the preparation of a resin which does not have the desirable characteristics of resins prepared according to the invention. More specifically, terpene-phenol resins prepared using boron trifluoride complexes derived from phenols (such as the phenolate) have relatively high softening points, in the range of 115° C., and will have unacceptably high amounts of solvent and/or phenol if finished to lower softening points in the range of 80°–110° C. Boron trifluoride complexes derived from alcohols (such as the methanolate, ethanolate and isopropanolate) afford terpene-phenol resins with very high amounts of dimers (terpene-terpene or terpene-phenol monoalkylates) which have to be stripped out, resulting in low yields.

In the preparation of the reaction mixture, the molar ratio of terpene to phenol is usually kept in the range of from about 1:1 to about 3:1. Reaction mixtures with terpene to phenol molar ratios of less than about 1:1 or greater than about 3:1 generally give resins with softening points outside the preferred range of from about 80° C. to about 110° C. Also, at molar ratios of greater than about 3:1, terpene dimers are formed which must be removed by distillation or sparging. If the dimers are left in the resin, the performance of the resin can be seriously degraded.

The molar ratio of the boron trifluoride complex to the total of terpene and phenol is generally in the range of from about 0.005:1 to about 0.05:1. Lower concentrations of the boron trifluoride complex often do not adequately catalyze the reaction to form the resin and higher concentrations of the complex are wasteful since they do not add to the speed or quality of the reaction and are sometimes deleterious to yield. Also, the additional complex must be neutralized upon completion of the reaction and prior to recovering the resin. This increases the cost of the reaction needlessly.

The preferred terpenes for use in this invention are α-pinene, β-pinene, dipentene and limonene. The use of any of these terpenes in the method described hereinabove will give terpene resins with the desired softening points, yields and colors. It is especially preferred that the terpene is α-pinene since that is the most inexpensive and readily available terpene currently available for use in the U.S. adhesive and ink formulation industry. A mixture of any or all of these terpenes which includes turpentines (volatile essential oils whose chief constituents include alpha-pinene, beta-pinene and dipentene) is also suitable for use in the present invention.

After the reaction is completed, the terpene-phenol resin is recovered from the reaction mixture by nitrogen sparging or distillation to a ring and ball softening point in the range of from about 80° C. to about 110° C.

The resulting resin is generally produced in a yield of from about 70% to about 99%. Further, the resin has a color in the range of from about 3 to about 6 on the Gardner scale. Resins prepared in a similar manner but using a different boron trifluoride complex have ring and ball softening points greater than 110° C. and colors that vary from about 4 to about 7−. Attempting to finish those resins to softening points in the desired temperature range generally results in resins with high residual levels of process solvents and phenol which are detrimental to the performance of the resin in adhesive and ink formulations.

The terpene resin produced according to the method of this invention is quite suitable for use in adhesive and ink formulations. The resins may be combined without the addition of diluents or other materials to adjust for the softening point or molecular weight distribution. Thus, adhesives and ink formulations prepared using the resins of the present invention are easier and less expensive to prepare and the resulting adhesives usually have better adhesion.

Thus, the present invention provides a method for producing a terpene-phenol resin with properties which are excellent for use in the preparation of adhesive and ink formulations. The method of the present invention requires temperatures which are significantly below the boiling point of water and uses few steps which is in contrast to the methods disclosed in the prior art. Further, the method provides terpene-phenol resins which have lower softening points, narrower ranges of softening points and resins with better color than were available previously.

In order to facilitate a further understanding of the invention, the following examples illustrate certain more specific details thereof.

EXAMPLE I

Phenol (46.8 parts by weight) was mixed in 270.8 parts by weight of a solvent (a blend of 45% xylene and 55% naphtha, VM&P grade). The phenol solution was placed in a 4-neck, 1000 ml, round bottom flask equipped with an overhead stirrer, temperature probe, nitrogen inlet and Dean Stark trap. The phenol solution was refluxed under nitrogen for 2 hours to dehydrate it. The dehydrated phenol solution was then cooled to ambient temperature. Approximately 1.5 parts by weight of the diethyl ether complex of boron trifluoride was added to the phenol solution followed by heating of the solution, with stirring, to a temperature of 75° C. While maintaining that temperature and over a 2 hour period, 203.2 parts by weight of α-pinene (Acintene A, Arizona Chemical Company) was added to the solution. This gave a 3:1 molar ratio of α-pinene to phenol. After the addition of the α-pinene was completed, the reaction mixture was maintained at a temperature in the range of from about 75° C. to about 77° C. for about 30 minutes. The boron trifluoride complex was destroyed by the addition of 115.7 parts by weight of a 1% sodium carbonate solution (an amount equal to the amount of boron trifluoride). The stirring of the solution was stopped and the layers were allowed to settle. The aqueous phase (bottom layer) was then withdrawn. The organic phase (top layer), containing the resin, was washed with two equal volume portions of de-ionized water. The resin was then isolated by distillation with a nitrogen sparge (2300 cc/min) to a temperature of 240° C. to remove the solvent. The nitrogen sparge was increased to 6000 cc/min until a ring and ball softening point of 98° C. was obtained. The resin was then cooled and removed from the flask.

The resin was produced in a yield of 77% and had a softening point of 98° C. The Gardner color was 3−/2+.

EXAMPLE II

Using the procedure of Example I, with an acetic acid complex of boron trifluoride in place of the diethyl ether complex, an α-pinene-phenol resin was produced in a yield of 94% with a ring and ball softening point of 92° C. The resin had a Gardner color of 4+.

EXAMPLE III

Another α-pinene-phenol resin was produced using the procedure of Example I, using a boron trifluoride phenolate complex which is the type of boron trifluoride complex in general use in commercial preparations of terpene resins. The resulting resin was produced at an 80% yield and had a ring and ball softening point of 118° C. The resin had a color of 4−.

Thus, the use of a phenolate complex of boron trifluoride under similar reaction conditions produced a resin with a much higher softening point than the softening points for resins produced according to the present invention. Such a resin would require a diluent in order to be used in adhesive or ink formulations which require low softening point resins.

EXAMPLE IV

Using the process of Example I, 60.1 parts of phenol in 269.2 parts of solvent, 1.5 parts diethyl ether complex of boron trifluoride and 189.9 parts of α-pinene (an α-pinene to phenol ratio of 2.2:1) were reacted to form an α-pinene-phenol resin in a 97% yield with a ring and ball softening point of 109° C. The resin had a color of 5+ on the Gardner scale.

EXAMPLE V

Using the process of Example IV, except that an acetic acid complex of boron trifluoride was used in place of the diethyl ether complex of boron trifluoride, an α-pinene-phenol resin was produced in 98% yield with a ring and ball softening point of 107° C. The resin had a color of 4+ on the Gardner scale.

EXAMPLE VI

Using the procedure of Example IV, an α-pinene-phenol resin was produced using the phenolate complex of boron trifluoride. The resulting resin was produced in 97% yield and had a ring and ball softening point of 120° C. The resin had a Gardner color of 7−.

Thus, α-pinene-phenol resins produced using boron trifluoride complexes with ethers or organic acids have softening points between 80° C. and 110° C. Those resins produced using the phenolate complex of boron trifluoride (the current commercial form of boron trifluoride used to produce resins of this type) have softening points outside that range. Table I summarizes the effect of varying the boron trifluoride complex in the method of the present invention.

TABLE I

| Example | Boron Trifluoride Complex | Softening Point (°C.) | Color | Yield (%) |
|---|---|---|---|---|
| I | BF$_3$.Diethyl ether | 98 | 3–/2+ | 70 |
| II | BF$_3$.Acetic acid | 92 | 4+ | 94 |
| III | BF$_3$.Phenolate | 118 | 4– | 80 |
| IV | BF$_3$.Diethyl ether | 109 | 5+ | 97 |
| V | BF$_3$.Acetic acid | 107 | 4+ | 98 |
| VI | BF$_3$.Phenolate | 120 | 7– | 97 |

Having thus described various preferred embodiments of the invention and several of its benefits and advantages, it will be understood by those of ordinary skill that the foregoing description is merely for the purpose of illustration and that numerous substitutions, rearrangements and modifications may be made in the invention without departing from the scope and spirit of the appended claims.

What is claimed is:

1. A process for preparing a terpene-phenol resin consisting essentially of the following steps:

preparing a mixture of ingredients comprising a complex of boron trifluoride and phenol, wherein the boron trifluoride complex is selected from the group consisting of an ether complex of boron trifluoride, wherein the ether has a molecular weight in the range of from about 46 to about 140, and an organic acid complex of boron trifluoride, wherein the organic acid has a molecular weight in the range of from about 46 to about 300;

heating the phenol-boron trifluoride complex mixture to a temperature in the range of from about 50° C. to about 90° C.;

adding a terpene to the heated phenol-boron trifluoride complex mixture in a molar ratio of terpene to phenol in the range of from about 1:1 to about 3:1 over a period of time in the range of from about 0.5 hour to about 10 hours with mixing thereby forming a reaction mixture;

maintaining the reaction mixture at a temperature in the range of from about 50° C. to about 90° C. for a period of time sufficient to produce the terpene-phenol resin; and recovering the terpene-phenol resin from the reaction mixture wherein the resin exhibits a softening point in the range of from about 80° to about 110° C.

2. The process of claim 1 wherein the molar ratio of the complex of boron trifluoride to terpene and phenol is in the range of from about 0.005:1 to about 0.05:1.

3. The process of claim 1 wherein the terpene is selected from the group consisting of turpentines, α-pinene, δ-3-carene, β-pinene, dipentene, limonene and mixtures of those terpenes.

4. The process of claim 3 wherein the terpene is α-pinene.

5. The process of claim 1 wherein the ether complex of boron trifluoride is selected from the group consisting of a dimethyl ether complex of boron trifluoride, a diethyl ether complex of boron trifluoride, a diisopropyl ether complex of boron trifluoride, a tetrahydrofuran complex of boron trifluoride, a dibutyl ether complex of boron trifluoride, and a methyl-tert-butyl ether complex of boron trifluoride.

6. The process of claim 1 wherein the organic acid complex of boron trifluoride is selected from the group consisting of a formic acid complex of boron trifluoride, an acetic acid complex of boron trifluoride, a propionic acid complex of boron trifluoride, and a butyric acid complex of boron trifluoride.

7. A process for preparing a terpene-phenol resin consisting essentially of the following step:

preparing a mixture of ingredients comprising a complex of boron trifluoride and phenol, wherein the boron trifluoride complex is selected from the group consisting of an ether complex of boron trifluoride, wherein the ether has a molecular weight in the range of from about 46 to about 140, and an organic acid complex of boron trifluoride, wherein the organic acid has a molecular weight in the range of from about 46 to about 300;

heating the phenol-boron trifluoride complex mixture to a temperature in the range of from about 50° C. to about 90° C.;

adding a terpene to the heated phenol-boron trifluoride complex mixture over a period of time in the range of from about 0.5 hour to about 10 hours with mixing thereby forming a reaction mixture, wherein the molar ratio of terpene to phenol is in the range of from about 1:1 to about 3:1, and the molar ratio of the complex of boron trifluoride to terpene and phenol is in the range of from about 0.005:1 to about 0.05:1;

maintaining the reaction mixture at a temperature in the range of from about 50° C. to about 90° C. for a period of time sufficient to produce the terpene-phenol resin; and recovering the terpene-phenol resin from the reaction mixture.

8. The process of claim 7 wherein the terpene is selected from the group consisting of turpentines, α-pinene, δ-3-carene, dipentene, β-pinene, limonene and mixtures of those terpenes.

9. The process of claim 8 wherein the terpene is α-pinene.

10. The process of claim 7 wherein the ether complex of boron trifluoride is selected from the group consisting of a dimethyl ether complex of boron trifluoride, a diethyl ether complex of boron trifluoride, a diisopropyl ether complex of boron trifluoride, a tetrahydrofuran complex of boron trifluoride, a dibutyl ether complex of boron trifluoride, and a methyl-tert-butyl ether complex of boron trifluoride.

11. The process of claim 7 wherein the organic acid complex of boron trifluoride is selected from the group consisting of a formic acid complex of boron trifluoride, an acetic acid complex of boron trifluoride, a propionic acid complex of boron trifluoride, and a butyric acid complex of boron trifluoride.

* * * * *